United States Patent
Su et al.

(10) Patent No.: US 12,273,978 B1
(45) Date of Patent: Apr. 8, 2025

(54) CONTROL METHOD, DEVICE, ELECTRONIC DEVICE, AND COMPUTER-READABLE STORAGE MEDIUM

(71) Applicant: Shenzhen Intellirocks Tech. Co., Ltd., Shenzhen (CN)

(72) Inventors: Jianqiang Su, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/896,013

(22) Filed: Sep. 25, 2024

(30) Foreign Application Priority Data

Oct. 10, 2023 (CN) .......................... 202311307204.5

(51) Int. Cl.
| | |
|---|---|
| *H05B 47/155* | (2020.01) |
| *H05B 47/105* | (2020.01) |
| *H05B 47/165* | (2020.01) |
| *H05B 47/175* | (2020.01) |
| *H05B 47/19* | (2020.01) |

(52) U.S. Cl.
CPC ......... *H05B 47/155* (2020.01); *H05B 47/105* (2020.01); *H05B 47/165* (2020.01); *H05B 47/19* (2020.01); *H05B 47/196* (2024.01)

(58) Field of Classification Search
CPC .. H05B 47/105; H05B 47/155; H05B 47/165; H05B 47/19; H05B 47/196
See application file for complete search history.

(56) References Cited

U.S. PATENT DOCUMENTS

| | | | | |
|---|---|---|---|---|
| 6,249,601 B1* | 6/2001 | Kim | ....................... | H04N 23/88 |
| | | | | 382/162 |
| 9,953,615 B2* | 4/2018 | Kwon | ................... | G06F 3/03547 |
| 10,147,345 B2* | 12/2018 | Choi | ..................... | G09G 3/3275 |
| 11,302,283 B2* | 4/2022 | Su | ............................ | G09G 5/10 |
| 2012/0176063 A1* | 7/2012 | Hatley | ................... | H05B 45/20 |
| | | | | 315/297 |
| 2016/0284261 A1* | 9/2016 | Choi | ..................... | G09G 3/3208 |
| 2017/0354014 A1* | 12/2017 | Chen | .................. | H05B 47/1965 |
| 2023/0269844 A1* | 8/2023 | Chen | .................... | H05B 47/125 |
| | | | | 315/150 |

FOREIGN PATENT DOCUMENTS

| | | | |
|---|---|---|---|
| CN | 110211062 A | | 9/2019 |
| CN | 115119357 A | * | 9/2022 |
| WO | WO-2020232812 A1 | * | 11/2020 |
| WO | WO-2024221394 A1 | * | 10/2024 |

* cited by examiner

*Primary Examiner* — Raymond R Chai
(74) *Attorney, Agent, or Firm* — Wenye Tan

(57) ABSTRACT

A control method is provided for a lamp. The lamp includes a plurality of light-emitting units, and the method includes: receiving target RGB data from a client terminal; and when the target RGB data exists in a correspondence relationship between RGB data and color temperature values, determining a target color temperature value corresponding to the target RGB data based on the correspondence relationship. The correspondence relationship between the RGB data and color temperature values is used to convert color temperature data into corresponding RGB data when an original Tuya protocol does not support color temperature data transmission. The method also includes controlling the plurality of light-emitting units to display corresponding lighting effect according to the target color temperature value.

14 Claims, 10 Drawing Sheets

CONTROL METHOD, DEVICE, ELECTRONIC DEVICE, AND COMPUTER-READABLE STORAGE MEDIUM

CROSS-REFERENCES TO RELATED APPLICATIONS

This application claims priority to Chinese Patent Application No. CN2023113072045, filed on Oct. 10, 2023, the content of which is hereby incorporated by reference in entirety.

FIELD OF THE TECHNOLOGY

The present disclosure relates to the technical field of lighting technology and, specifically, to a control method, device, electronic device, and computer-readable storage medium.

BACKGROUND OF THE DISCLOSURE

In daily life, in order to create atmospheres in different environments or meet personalized needs, users can usually personalize the lighting effects displayed by lamps. Because the original or existing Tuya (communication) protocol only supports the transmission of RGB data, when users personalize lamps through terminal devices, they can only set the color displayed by the lamps, but often cannot set the color temperature displayed by the lamps. However, the atmospheres and effects presented by the same color at different color temperatures are different. If the color temperature displayed by the lamps cannot be set, the results of the lighting effect displayed by the lamps is often poor.

The disclosed methods and apparatus are directed to solve one or more problems set forth above and other problems.

SUMMARY

Embodiments of the present application disclose a control method, a device, an electronic device and a computer-readable storage medium, which can improve the effect of the lighting effect displayed by lamps.

According to one aspect of the present disclosure, a control method is provided for a lamp. The lamp includes a plurality of light-emitting units, and the method includes: receiving target RGB data from a client terminal; and when the target RGB data exists in a correspondence relationship between RGB data and color temperature values, determining a target color temperature value corresponding to the target RGB data based on the correspondence relationship. The correspondence relationship between the RGB data and color temperature values is used to convert color temperature data into corresponding RGB data where an original Tuya protocol does not support color temperature data transmission. The method also includes controlling the plurality of light-emitting units to display corresponding lighting effect according to the target color temperature value.

According to another aspect of the present disclosure, a control method is provided for a client terminal. The control method includes: determining customized data in response to a setting operation on a customization interface; when the customized data includes a color temperature value, determining first RGB data corresponding to the customized data based on a first correspondence relationship between RGB data and color temperature values, wherein the first correspondence relationship between the RGB data and color temperature values is used to convert color temperature data into corresponding RGB data when the original Tuya protocol does not support color temperature data transmission; and sending the first RGB data to a lamp, so that the lamp can determine a target color temperature value corresponding to the first RGB data based on the correspondence relationship between the RGB data and color temperature values, and control a plurality of light-emitting units included in the lamp to display corresponding lighting effect according to the target color temperature value.

According to another aspect of the present disclosure, a computer-readable storage medium is provided. The computer-readable storage medium stores a computer program which, when executed by a processor, is configured for implementing a control method. The control method includes: determining customized data in response to a setting operation on a customization interface; when the customized data includes a color temperature value, determining first RGB data corresponding to the customized data based on a first correspondence relationship between RGB data and color temperature values, wherein the first correspondence relationship between the RGB data and color temperature values is used to convert color temperature data into corresponding RGB data when the original Tuya protocol does not support color temperature data transmission; and sending the first RGB data to a lamp, so that the lamp can determine a target color temperature value corresponding to the first RGB data based on the correspondence relationship between the RGB data and color temperature values, and control a plurality of light-emitting units included in the lamp to display corresponding lighting effect according to the target color temperature value.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the art may derive other drawings from these accompanying drawings without creative efforts.

DETAILED DESCRIPTION

Figure 1:
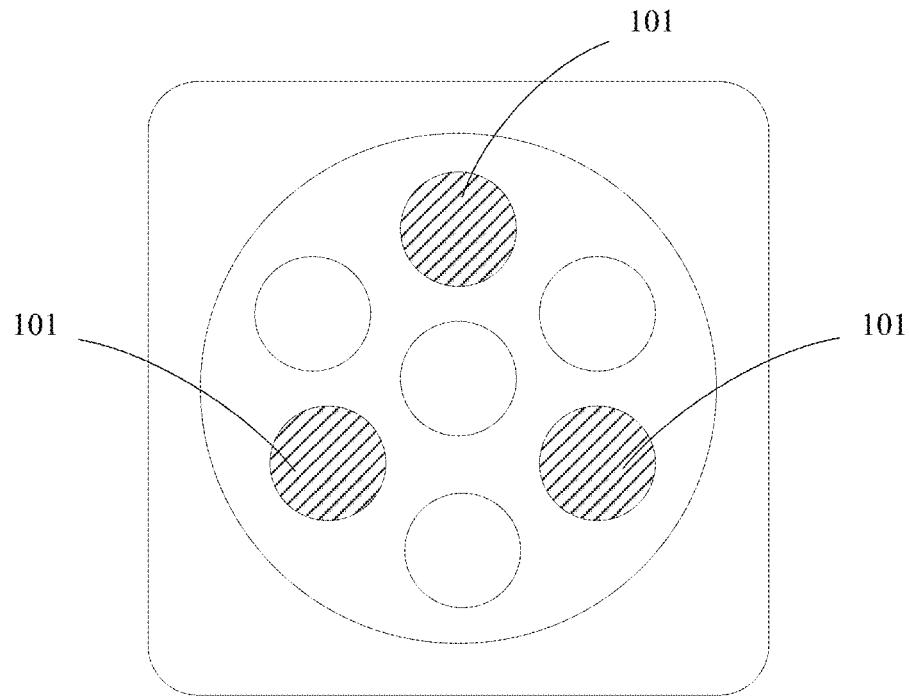
FIG. 1 illustrates a schematic diagram of a lighting effect according to an embodiment of the present disclosure.

The following describes certain embodiments in detail, and examples of the embodiments are shown in the accompanying drawings. Unless otherwise specified, the same or similar reference numerals throughout may represent same or similar elements. The embodiments described below with reference to the accompanying drawings are for examples and are only used to explain the present disclosure, not to limit the present disclosure.

In order to help those skilled in the art to better understand the present disclosure, the following describes technical solutions in certain embodiments of the present disclosure in combination with the accompanying drawings. Apparently, the described embodiments are only some embodiments of the present disclosure, and not all of the embodiments. Based on the disclosed embodiments in the present disclosure, other embodiments obtained by those skilled in the art without creative work are within the scope of the present disclosure.

In daily life, in order to create atmospheres in different environments or meet personalized needs, users can usually personalize the lighting effects displayed by lamps. Because the original or existing Tuya (communication) protocol only supports the transmission of RGB data, when users personalize lamps through terminal devices, they can only set the color displayed by the lamps, but often cannot set the color temperature displayed by the lamps. However, the atmospheres and effects presented by the same color at different color temperatures are different. If the color temperature displayed by the lamps cannot be set, the results of the lighting effect displayed by the lamps is often poor.

In order to solve the above problem and/or other related problems, in the embodiments of the present disclosure, the user can customize the lighting effect displayed by the lamp through a client terminal. The client terminal, as used herein, may refer to a terminal device such as a smart phone or a computer together with applications (Apps) to perform various functions of the present disclosure, or the client terminal may also refer to a software application program running on a user device to perform various functions of the present disclosure. The client terminal can determine the customized data in response to the user's setting operation on the customization interface. If the customized data is a color temperature value, the first RGB data corresponding to the customized data can be determined based on a first correspondence relationship between RGB data and color temperature values, and then the first RGB data can be sent to the lamp. After the lamp receives the first RGB data, if the first RGB data exists in the first correspondence relationship, a target color temperature value corresponding to the first RGB data can be determined based on the first correspondence relationship. Further, a corresponding lighting effect can be controlled according to the target color temperature value. Thus, even when the original Tuya protocol only supports the transmission of RGB data, the user can still set the color temperature displayed by the lamp, thereby improving the lighting effect of the lamp. The Tuya protocol, as used herein, may refer to a specific communication protocol used for data communication between the terminal device and the lamp. However, other protocols may also be applicable, and any suitable communication protocol may be used or adopted.

FIG. 1 illustrates a schematic diagram of a lighting effect according to an embodiment of the present disclosure. As shown in FIG. 1, the effect schematic diagram is a schematic diagram of the lighting effect displayed by a light-emitting unit at the color temperature of approximately 2000K. A light-emitting unit may include multiple lamp beads, and the color temperature displayed by the light-emitting unit may be changed by controlling the operation states of the multiple lamp beads. In FIG. 1, three lamp beads 101 are in the operation state 'ON' to achieve the effect of the color temperature of 2000K.

Figure 2:
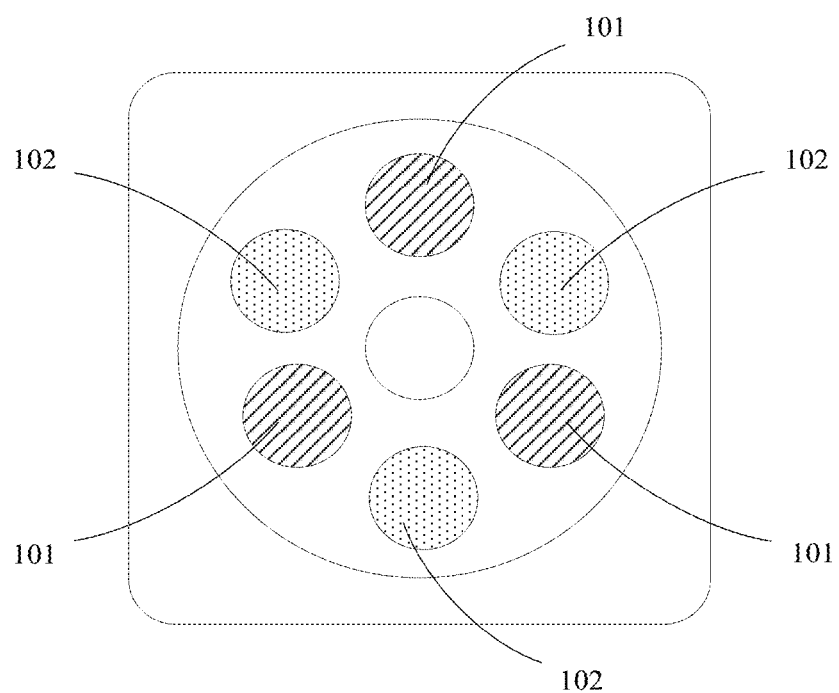
FIG. 2 illustrates a schematic diagram of another lighting effect according to an embodiment of the present disclosure.

FIG. 2 illustrates a schematic diagram of another lighting effect according to an embodiment of the present disclosure. As shown in FIG. 2, the effect schematic diagram is a schematic diagram of the lighting effect by the light-emitting unit at the color temperature of approximately 4350K. In FIG. 2, the light-emitting unit may include seven lamp beads, and six lamp beads are in the operation state 'ON', which may include three lamp beads 101 and three lamp beads 102. Further, the lamp beads 101 and the lamp beads 102 may display different lighting effects to achieve the effect of a color temperature of 4350K.

Figure 3:
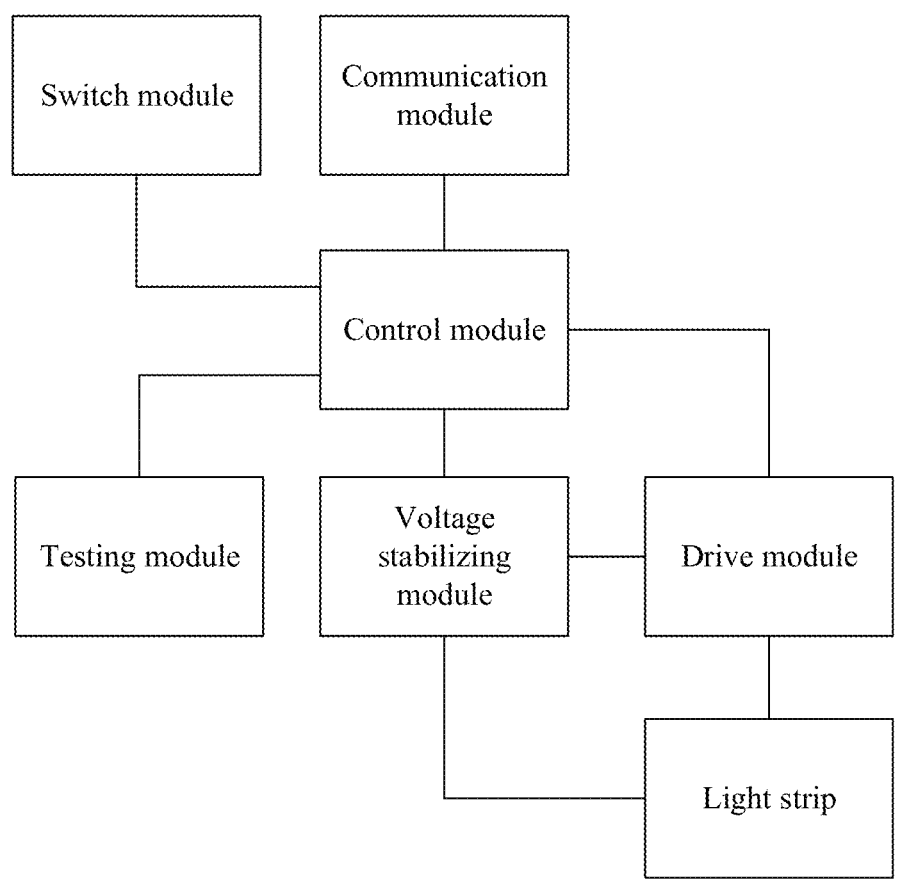
FIG. 3 illustrates a schematic structural diagram of a lamp according to an embodiment of the present disclosure.

FIG. 3 illustrates a schematic structural diagram of a lamp according to an embodiment of the present disclosure. As shown in FIG. 3, the lamp may include a switch module, a communication module, a control module, a drive module, a testing module, a voltage stabilizing module, and a light strip, etc. The light strip may include multiple light-emitting units. Further, the control module is respectively connected to the switch module, the communication module, the drive module, the testing module, and the voltage stabilizing module. The drive module is connected to the voltage stabilizing module and the light strip respectively, and the light strip is connected to the voltage stabilizing module.

The switch module can be used to control the operation state of the lamp, which can include an 'ON' operation state and an 'OFF' operation state. In the 'ON' operation state, the lamp can communicate with an external device, control the light strip to display the corresponding lighting effect, and test the light strip. The functions of the lamp in the operation state is not limited here. For example, when the state of the lamp is the 'OFF' operation state, the lamp can be put into the 'ON' operation state through the switch module. When the state of the lamp is the 'ON' operation state, the lamp can be put into the 'OFF' operation state through the switch module. The communication module can be used for the lamp to establish a communication link with an external device to transmit and/or receive data. For example, the user can first establish a communication connection between a client terminal and the lamp, and then modify the operation parameters of the lamp through the client terminal, and transmit the data corresponding to the operation parameters to the control module of the lamp through the communication module of the lamp. The control module can be used to process the data, obtain a control signal, and send the control signal to the drive module to drive the light strip to operate. For example, after the user modifies the operation parameters of the lamp, the control module can process the data corresponding to the operation parameters to obtain the corresponding control signal, and then send the control signal to the drive module. The drive module can be used to drive the light strip to work according to the control signal. For example, the drive module can output the corresponding current value according to the control signal to drive the light strip to operate. The testing module can be used to test/debug the lamp and obtain testing/debugging information. The voltage stabilizing module can provide a stable working voltage for the lamp.

Figure 4:
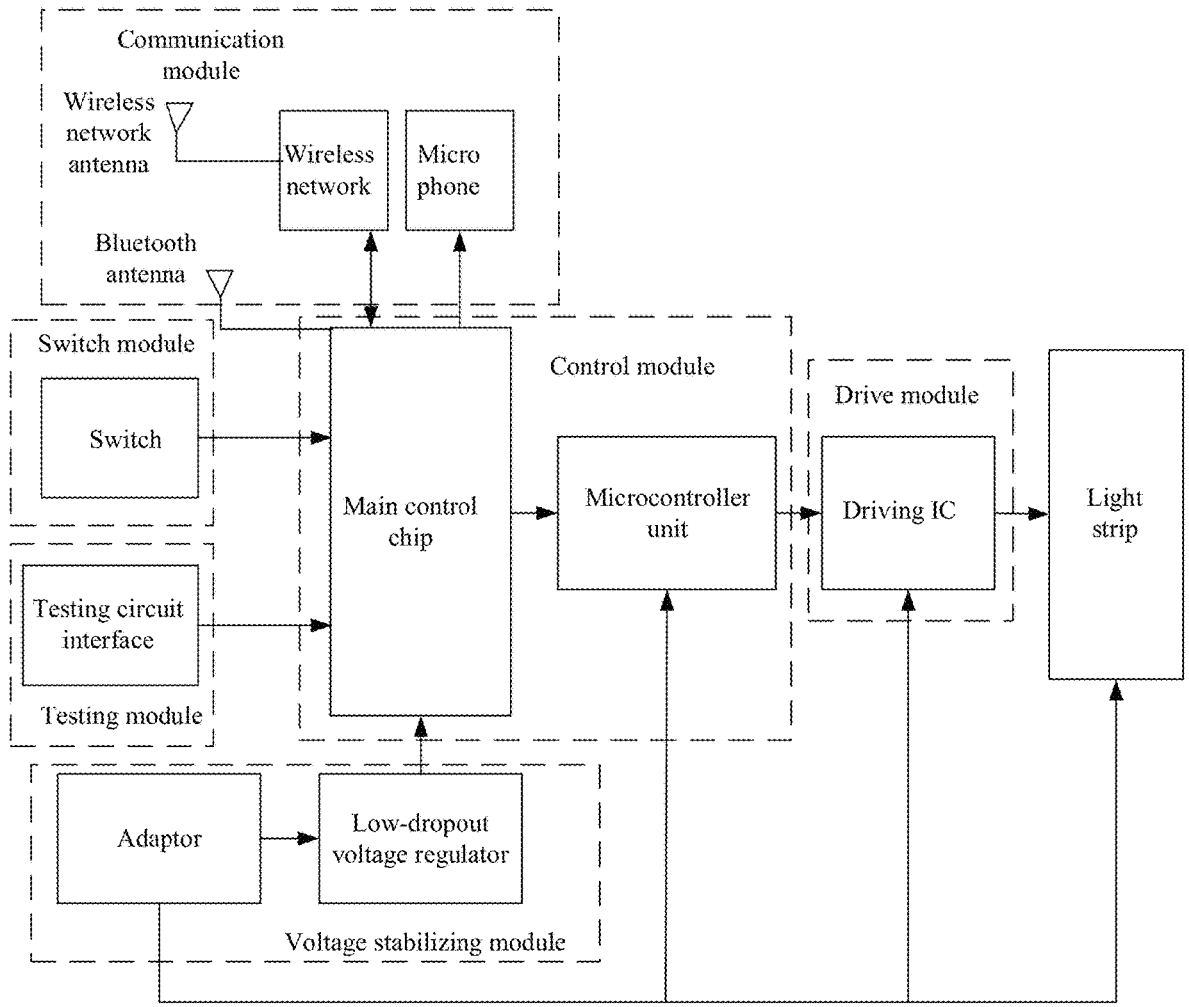
FIG. 4 illustrates a schematic structural diagram of another lamp according to an embodiment of the present disclosure.

FIG. 4 illustrates a structural schematic diagram of another lamp according to an embodiment of the present disclosure. As shown in FIG. 4, the switch module may include a switch, and the user may control the state of the lamp through the switch. The communication module may include a wireless network (Wireless Fidelity, WIFI) submodule, a microphone (MIC) submodule, a WIFI antenna (Antenna, ANT), and a Bluetooth antenna, etc. The WIFI submodule may be used to receive or send information related to the lamp, and the MIC submodule may be used to collect voice signals. The control module may include a main control chip and a microcontroller unit (MCU). The main control chip and the MCU may be connected to the voltage stabilizing module respectively, and the main control chip may be used to process information related to the lamp so as to obtain corresponding data. The information related to the lamp may include Bluetooth information, WIFI information, sound information collected by MIC, etc. The MCU may convert the data sent by the main control chip into a control signal and may send the control signal to the drive module. The drive module may include a driving integrated circuit (IC), which may output a corresponding current value according to the control signal to drive the light strip to operate. The testing module may include a testing/debugging circuit interface, which may be used to print testing/debugging information. The voltage stabilizing module may include an adapter and a low-dropout voltage regulator. The light strip may be used to display the corresponding lighting effect.

Figure 5:
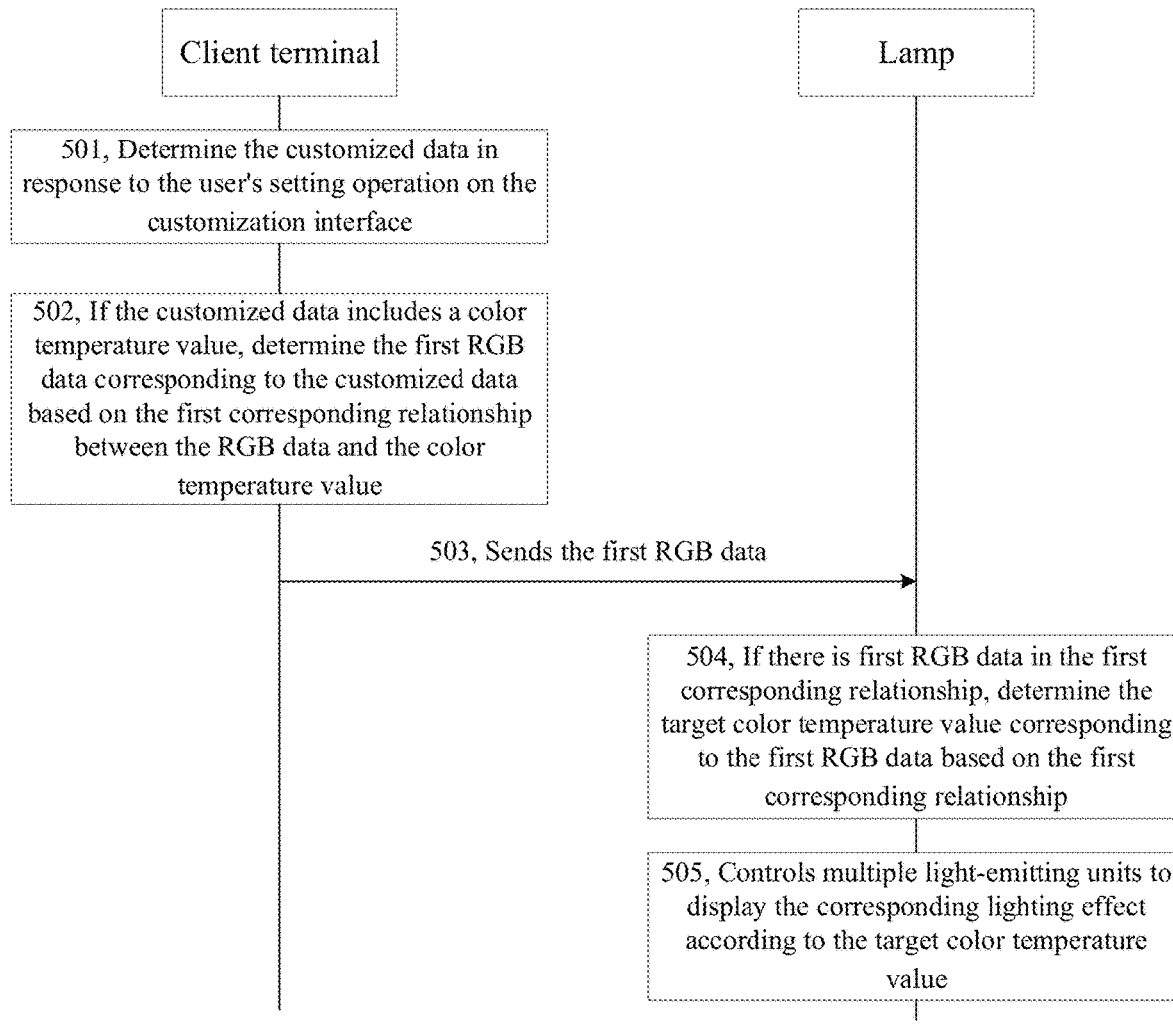
FIG. 5 illustrates a flow diagram of a control method according to an embodiment of the present disclosure.

FIG. 5 illustrates a flow chart of a control method according to an embodiment of the present disclosure. As shown in FIG. 5, the method includes the following steps.

501. The client terminal may determine the customized data in response to the user's setting operation on the customization interface.

The user can customize the lighting effect displayed by the lamp through the customization interface of the client terminal, and the client terminal can determine the customized data in response to the user's setting operation on the customization interface.

The customization interface may refer to an interface in which the user can customize the lighting effect to be displayed by the lamp. For example, the customization interface can be a display interface for setting the color corresponding to the lighting effect displayed by the lamp, or a display interface for setting the color and color temperature corresponding to the lighting effect displayed by the lamp, or other interfaces with the function of setting the lighting effect displayed by the lamp.

The setting operation may refer to the operation performed by the user to customize the lighting effect of the lamp through the customization interface. For example, the setting operation may be an operation for the user to select the color of the lighting effect displayed by the lamp through the customization interface, or an operation for the user to adjust the color temperature of the lighting effect displayed by the lamp through the customization interface, or an operation for the user to select the color of the lighting effect displayed by the lamp through the customization interface and an operation for adjusting the color temperature of the lighting effect displayed by the lamp.

The customized data may refer to data corresponding to the user's customized setting of the lighting effect to be displayed by the lamp. For example, the customized data may be data corresponding to the color of the lighting effect displayed by the lamp, or data corresponding to the color temperature of the lighting effect displayed by the lamp, or other data related to the lighting effect.

Figure 6:
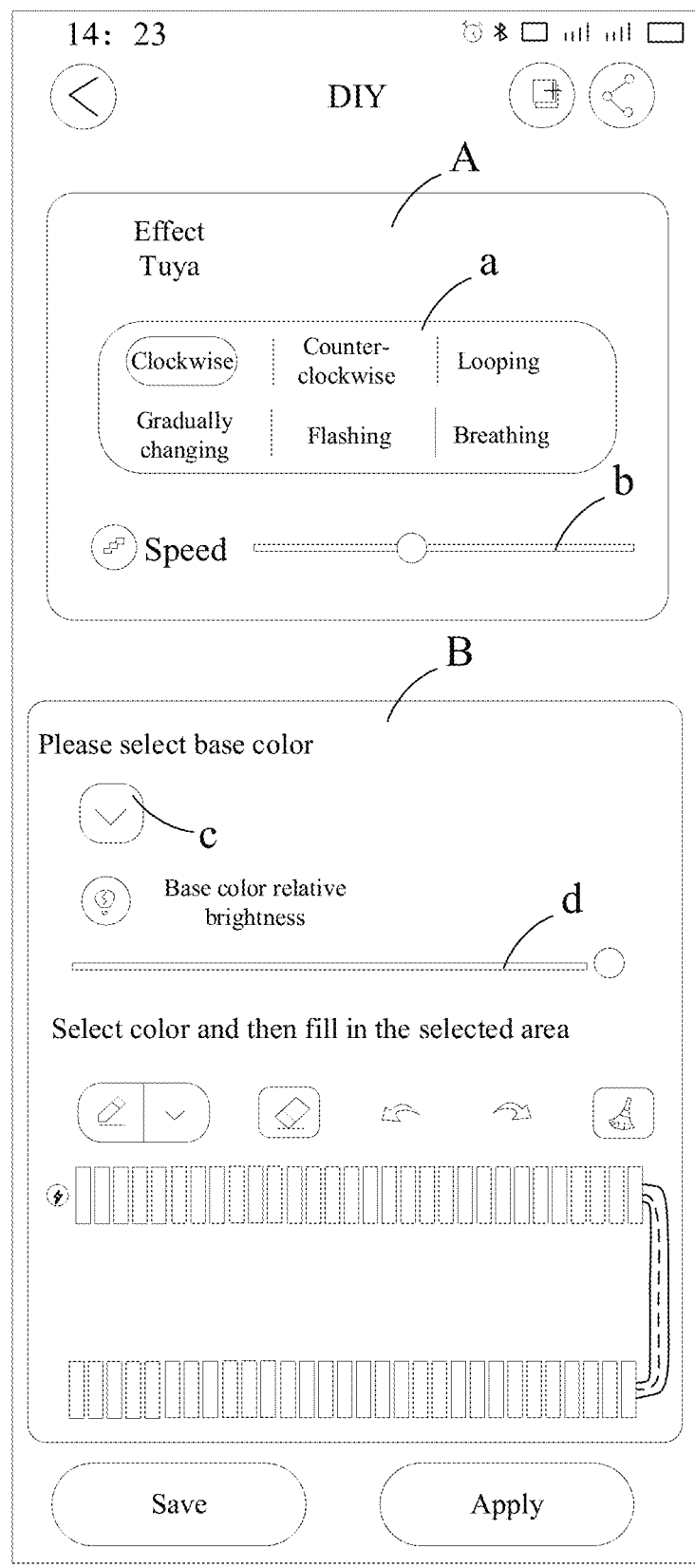
FIG. 6 illustrates a schematic diagram of an interface of a client terminal according to an embodiment of the present disclosure.

FIG. 6 illustrates a schematic diagram of an interface of a client terminal according to an embodiment of the present disclosure. The interface may be an interface for customizing (e.g., Do It Yourself or DIY) effect and color drawing/painting areas. The interface may include an effect drawing area and a color drawing area. The user can customize the dynamic presentation effect of the lighting effect through the effect drawing area, and then customize the color of the lighting effect through the color drawing area. As shown in FIG. 6, 'A' is the effect drawing area and B is the color drawing area. For example, the effect drawing area 'A' may include an effect selection control and a speed determination control, where 'a' is the effect selection control and 'b' is the speed selection control. For example, the user can customize the dynamic presentation effect of the lighting effect through the effect selection control, and can customize the speed corresponding to the dynamic presentation effect of the lighting effect through the speed selection control. For example, the color drawing area may include a color selection control and a brightness selection control, where 'c' is a color selection control and 'd' is a brightness selection control. For example, the user can customize the color of the lighting effect through the color selection control, and can customize the brightness of the color through the brightness selection control.

Figure 7:
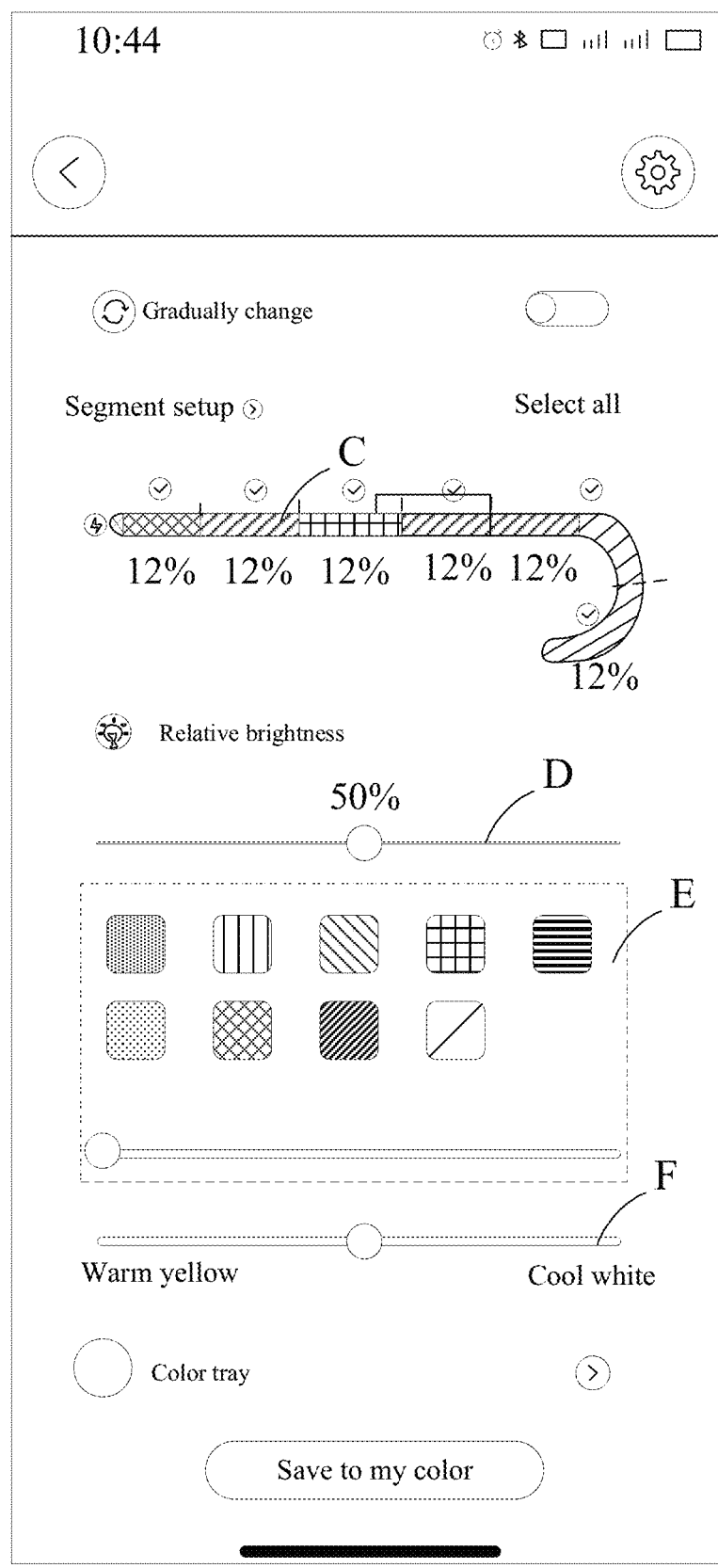
FIG. 7 illustrates a schematic diagram of an interface of another client terminal according to an embodiment of the present disclosure.

FIG. 7 illustrates a schematic diagram of another interface of a client terminal according to an embodiment of the present disclosure. The interface can be an interface for customizing (e.g., Do It Yourself, DIY) color and color temperature. The interface may include customization setting controls such as segment selection controls, brightness selection controls, color selection areas, and color temperature selection controls. Specifically, 'C' is a segment selection control, 'D' is a brightness selection control, 'E' is a color selection area, and 'F' is a color temperature selection control. For example, the user can select the segment that needs to be customized through the segment selection control, and then customize the color of the segment through the color selection area, customize the brightness of the segment color through the brightness selection control, and customize the color temperature of the lighting effect through the color temperature selection control.

As an implementation, a light-emitting unit may include multiple lamp beads, and the client terminal may also determine the target lamp bead information in response to the selection operation of the target lamp bead(s) among the multiple lamp beads.

In order for the light-emitting unit to display different lighting effects, each light-emitting unit may include multiple lamp beads. When the user customizes the lighting effect displayed by the lamp through the customization interface of the client terminal, the user may also select a target light-emitting unit(s) from the multiple light-emitting units, and then select the target lamp bead(s) that needs to be customized from the target light-emitting unit, so as to achieve the controlling of the target lamp bead(s) to display the corresponding lighting effect. The number of target light-emitting units may be 1, 2, 3, or other values, which may be determined according to the actual situation. The number of target lamp beads may be 1, 2, 3, or other values, which may be determined according to the actual situation. When the number of target lamp beads is greater than 1, the multiple target lamp beads may all be lamp beads of one light-emitting unit, or they may be lamp beads of different light-emitting units. The client terminal can respond to the user's selection operation for the target lamp beads and determine the target lamp bead information. The target lamp bead information can include the unique code of the target lamp bead, the unique code of the target light-emitting unit corresponding to the target lamp bead, and the serial number of the target lamp bead in the light-emitting unit, and other information that can uniquely identify the target lamp bead.

502. If the customized data is a color temperature value, the client terminal determines first RGB data corresponding to the customized data based on a first correspondence relationship between RGB data and color temperature values.

More specifically, after determining the customized data, the client terminal may determine the type of the customized data, that is, whether the customized data is data corresponding to the color of the lighting effect, data corresponding to the color temperature of the lighting effect, or other data related to the lighting effect. In the case where the customized data is the data corresponding to the color temperature, the client terminal can determine the first RGB data corresponding to the customized data based on the first correspondence relationship between the RGB data and color temperature values.

It can be understood that the client terminal can store the first correspondence relationship between the RGB data and color temperature values, and such correspondence can be pre-set and stored in the client terminal. For example, as shown in the following table, the RGB data includes R value, G value and B value, and each color temperature value has a corresponding R value, G value and B value.

| R | G | B | Color temperature value |
|---|---|---|---|
| $A_1$ | $B_1$ | $C_1$ | 2200 K |
| $A_2$ | $B_2$ | $C_2$ | 2250 K |
| ... | ... | ... | ... |
| $A_n$ | $B_n$ | $C_n$ | 6450 K |
| $A_{n+1}$ | $B_{n+1}$ | $C_{n+1}$ | 6500 K |

Where $0 \leq A_n \leq 255$, $0 \leq B_n \leq 255$, $0 \leq C_n \leq 255$, and n is an integer greater than or equal to 1. For example, when the color temperature value is 2200K, the A value corresponding to the color temperature value can be set to 255, the corresponding B value to 140, and the corresponding C value to 80.

After the color temperature data is converted into the corresponding RGB data, the color temperature of the lamp can be controlled even when the original Tuya protocol does not support color temperature transmission. Thus, there is no need to use a new protocol, thereby reducing both development time and testing workload.

503. The client terminal sends the first RGB data to the lamp.

After the user saves the setting operation for the customization interface, the client terminal can send the first RGB data to the lamp so that the lamp displays the corresponding lighting effect according to the first RGB data.

As an implementation, when sending the first RGB data to the lamp, the client terminal can also send the target lamp bead information to the lamp so that the lamp determines the target lamp bead(s) according to the target lamp bead information, and then controls the target lamp bead(s) to display the corresponding lighting effect according to the target color temperature value.

When the user selects the target lamp bead(s) during performing custom settings through the customization interface of the client terminal, the client terminal can send the target lamp bead information to the lamp so that the lamp can determine the target lamp bead(s) according to the target lamp bead information, and then control the target lamp bead(s) to display the corresponding lighting effect according to the target color temperature value.

504. If there is first RGB data in the first correspondence relationship, the lamp determines the target color temperature value corresponding to the first RGB data based on the first correspondence relationship.

The lamp can receive the first RGB data from the client terminal. After receiving the first RGB data sent by the client terminal, the lamp may first determine the type of the first RGB data. When the first RGB data is data corresponding to the color temperature, the target color temperature value corresponding to the first RGB data can be determined based on the first correspondence relationship.

It can be understood that the lamp can also store the first correspondence relationship between the RGB data and color temperature values, which can be pre-set and stored in both the lamp and the client terminal.

As an implementation, after receiving the first RGB data sent by the client terminal, the lamp may first verify the first RGB data. If the verification is correct or successful, it means that the first RGB data transmission is successful, and the corresponding lighting effect can be displayed according to the first RGB data. If the verification is wrong or unsuccessful, it means that the RGB data transmission fails or there is data damage. By verifying the received first RGB data, the integrity and accuracy of the first RGB data can be ensured, thereby improving the accuracy of the displayed lighting effect.

As an implementation, the lamp can also receive the first RGB data and the target lamp bead information from the client terminal.

505. The lamp controls multiple light-emitting units to display the corresponding lighting effect according to the target color temperature value.

After determining the target color temperature value, the lamp can control multiple light-emitting units to display the corresponding lighting effect according to the target color temperature value.

As an implementation, the lamp can also determine the target lamp bead(s) according to the target lamp bead information; and control the target lamp bead(s) to display the corresponding lighting effect according to the target color temperature value.

In the case where the lamp receives the first RGB data and the target lamp bead information from the client terminal, the lamp can first determine the target lamp bead(s) according to the target lamp bead information, so that the target lamp bead(s) can be controlled to display the corresponding lighting effect according to the target color temperature value.

As an implementation, controlling multiple light-emitting units to display corresponding lighting effects according to the target color temperature value may include: calculating the output grayscale of cold white color and the output grayscale of warm white color according to the target color temperature value; and controlling multiple light-emitting units to display corresponding lighting effects according to the output grayscale of cold white color and the output grayscale of warm white color.

When controlling multiple light-emitting units to display corresponding lighting effects according to the target color temperature value, the output grayscale of cool white (CW) and the output grayscale of warm white color (WW) can be calculated according to the target color temperature value, and then the corresponding lighting effect can be displayed according to the output grayscale of CW and the output grayscale of WW.

Accordingly, in embodiments described in FIG. 5, the user can customize the lighting effect displayed by the lamp through the client terminal, and the client terminal can determine the customized data in response to the user's setting operation on the customization interface. In the case where the customized data is a color temperature value, the client terminal can determine the first RGB data corresponding to the customized data based on the first correspondence relationship between the RGB data and color temperature values. The client terminal can send the first RGB data to the lamp and, after the lamp receives the first RGB data, the lamp can determine the target color temperature value corresponding to the first RGB data based on the first correspondence relationship when the first RGB data exists in the first correspondence relationship, and then can control multiple light-emitting units to display the corresponding lighting effect according to the target color temperature value. Thus, even when the Tuya protocol only supports the transmission of RGB data, the user can set the color temperature to be displayed by the lamp, thereby improving the lighting effect displayed by the lamp.

Figure 8:
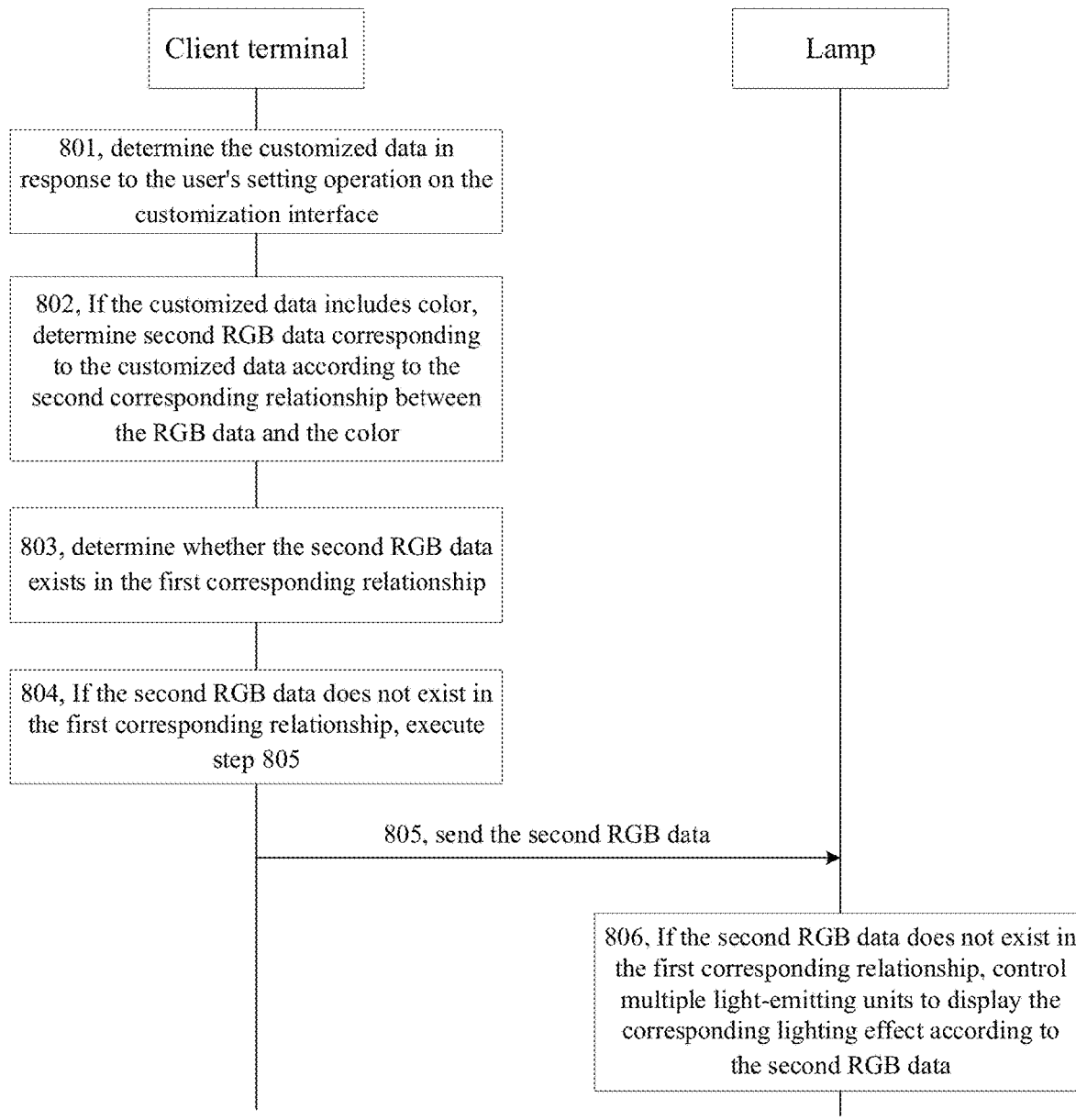
FIG. 8 illustrates a flow diagram of another control method according to an embodiment of the present disclosure.

FIG. 8 illustrates a flowchart of another control method according to an embodiment of the present disclosure. As shown in FIG. 8, the method includes the following steps.

801. The client terminal determines the customized data in response to the user's setting operation on the customization interface.

The user can customize the lighting effect displayed by the lamp through the customization interface of the client terminal, and the client terminal can determine the customized data in response to the user's setting operation on the customization interface.

The customization interface refers to the interface in which the user can customize the lighting effect displayed by the lamp. The setting operation refers to the operation performed by the user to customize the lighting effect of the lamp through the customization interface. The customized data refers to the data corresponding to the user's customized setting of the lighting effect displayed by the lamp.

In an embodiment, the light-emitting unit may include multiple lamp beads, and the client terminal may also determine the target lamp bead information in response to the selection operation of the target lamp bead(s) among the multiple lamp beads. The detailed description of step 801 can refer to the detailed description of step 501.

802. If the customized data includes a color value, the client terminal may determine second RGB data corresponding to the customized data according to the second correspondence relationship between RGB data and color values.

After determining the customized data, the client terminal can determine the type of the customized data, that is, whether the customized data is data corresponding to the color of the lighting effect, data corresponding to the color temperature of the lighting effect, data corresponding to the brightness of the lighting effect, or other data related to the lighting effect. In the case where the customized data includes color data, the client terminal can determine the second RGB data corresponding to the customized data based on the second correspondence relationship between the RGB data and color values.

The client terminal can store the second correspondence relationship between RGB data and color values. After the user selects a color through the customization interface, the client terminal can determine the second RGB data corresponding to the color value based on the second correspondence relationship.

803. The client terminal determines whether the second RGB data exists in the first correspondence relationship.

After the client terminal determines the second RGB data, the client terminal can first determine whether the second RGB data exists in the first correspondence relationship based on the first correspondence relationship between RGB data and color temperature values.

804. If the second RGB data does not exist in the first correspondence relationship, the client terminal executes step 805.

That is, in the case where the second RGB data does not exist in the first correspondence relationship, the client terminal can execute step 805.

As an implementation, sending the second RGB data to the lamp also includes: if the second RGB data exists in the first correspondence relationship, the second RGB data is adjusted to obtain third RGB data, so that the adjusted RGB data or the third RGB data does not exist in the first correspondence relationship; and sending the third RGB data to the lamp.

When the second RGB data exists in the first correspondence relationship, the client terminal can adjust the second RGB data, so that the adjusted RGB data does not exist in the first correspondence relationship, to obtain the third RGB data, and then send the third RGB data to the lamp. Therefore, it can be avoided that the lamp produces an erroneous lighting effect due to the RGB data corresponding to the color set by the user also existing in the first correspondence relationship, thereby improving the accuracy of the lighting effect displayed by the lamp.

For example, when adjusting the second RGB data, the R value, G value, and B value in the RGB data can be respectively subtracted by a preset values, and the preset value can be set according to actual needs. For example, when the R value in the second RGB data is 255, the G value is 140, and the B value is 80, and the preset value is 1, the adjusted second RGB data can be obtained according to the second RGB data and the preset value, by subtracting the preset value from the RGB values, and the R value in the adjusted second RGB data is 254, the G value is 139, and the B value is 79. If there is no RGB data with an R value of 254, a G value of 139, and a B value of 79 in the first correspondence relationship, the adjusted second RGB data is determined as the third RGB data. After determining the third RGB data, the third RGB data can be sent to the lamp so that the lamp displays the corresponding lighting effect according to the third RGB data.

805. The client terminal sends the second RGB data to the lamp.

After determining that the second RGB data exists in the first correspondence relationship, the client terminal can send the second RGB data to the lamp so that the lamp displays the corresponding lighting effect according to the second RGB data.

As an implementation, when sending the second RGB data to the lamp, the client terminal can also send the target lamp bead information to the lamp so that the lamp determines the target lamp bead(s) according to the target lamp bead information, and then controls the target lamp bead(s) to display the corresponding lighting effect according to the second RGB data.

When the user selects the target lamp bead(s) while performing customized settings through the customization interface of the client terminal, the client terminal can also send the target lamp bead information to the lamp so that the lamp can determine the target lamp bead(s) according to the target lamp bead information, and then control the target lamp bead(s) to display the corresponding lighting effect according to the second RGB data.

806. If the second RGB data does not exist in the first correspondence relationship, the lamp controls multiple light-emitting units to display the corresponding lighting effect according to the second RGB data.

The lamp can receive the second RGB data from the client terminal. After receiving the second RGB data sent by the client terminal, the lamp can first determine the type of the second RGB data. When the second RGB data is color corresponding data, the lamp can control multiple light-emitting units to display the corresponding lighting effect according to the second RGB data.

In one embodiment, when the lamp does not determine the type of the second RGB data or might be unable to determine the type of the second RGB data, the lamp may first determine whether the second RGB data exists in the first correspondence relationship, same as the first RGB data. Because the second RGB data does not exist in the first correspondence relationship due to the operation on the client terminal, the lamp can treat the second RGB data as the color corresponding data, and the lamp can control multiple light-emitting units to display the corresponding lighting effect according to the second RGB data.

As an implementation, the lamp can also receive the second RGB data and the target lamp bead information from the client terminal, and then determine the target lamp bead(s) according to the target lamp bead information, so that the target lamp bead(s) can be controlled to display the corresponding lighting effect according to the second RGB data.

As an implementation, after receiving the second RGB data sent by the client terminal, the lamp can first verify the second RGB data. If the verification is correct, it means that the second RGB data transmission is successful, and the corresponding lighting effect can be displayed according to the second RGB data. If the verification is wrong, it means that the RGB data transmission fails or there is data damage. By verifying the received second RGB data, the integrity and accuracy of the second RGB data can be ensured, thereby improving the accuracy of the displayed lighting effect.

Accordingly, in embodiments described in FIG. 8, the user can customize the lighting effect displayed by the lamp through the client terminal, and the client terminal can determine the customized data in response to the user's setting operation on the customization interface. In the case where the customized data is a color, the client terminal can determine the second RGB data corresponding to the customized data based on the second correspondence relationship between the RGB data and the color values, and can also determine whether the second RGB data exists in the first correspondence relationship. In the case where the second RGB data does not exist in the first correspondence relationship, the client terminal can send the second RGB data to the lamp. After the lamp receives the second RGB data, if the second RGB data does not exist in the first correspondence relationship, the lamp can control multiple light-emitting units to display the corresponding lighting effect according to the second RGB data, thereby avoiding the lamp from producing an erroneous lighting effect.

Figure 9:
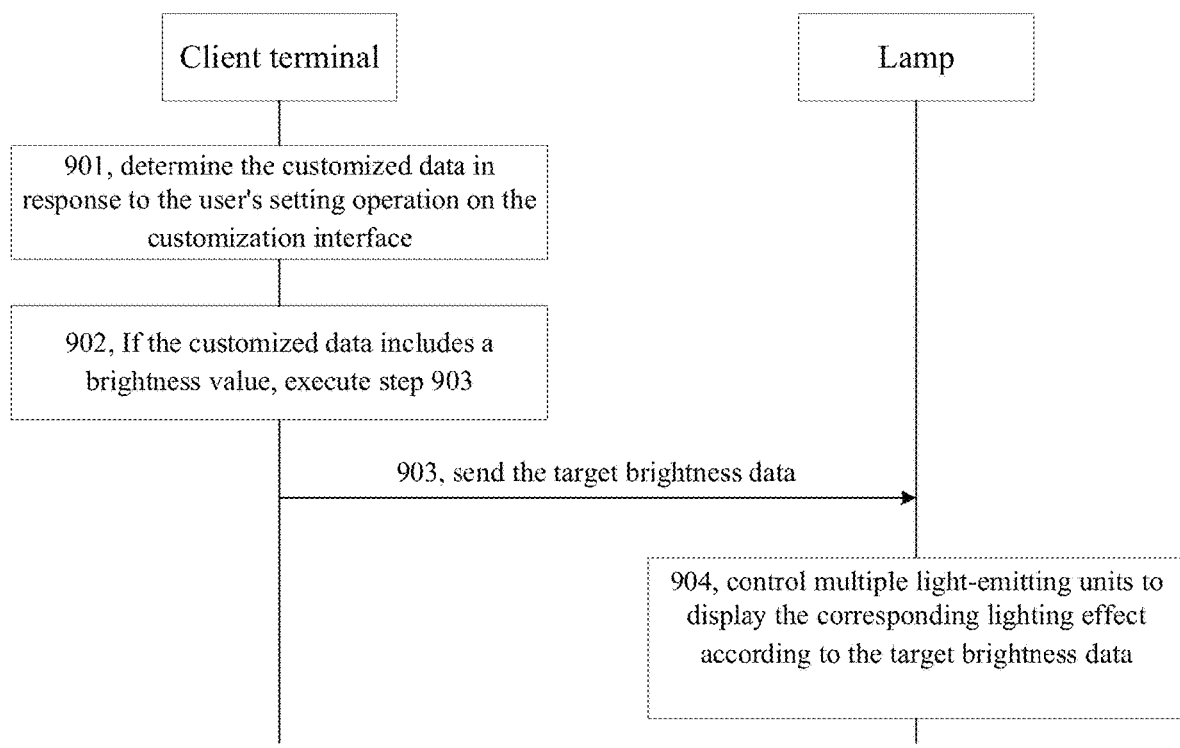
FIG. 9 illustrates a flow diagram of another control method according to an embodiment of the present disclosure.

FIG. 9 illustrates a flowchart of another control method according to an embodiment of the present disclosure. As shown in FIG. 9, the method includes the following steps.

901. The client terminal determines the customized data in response to the user's setting operation on the customization interface.

The user can customize the lighting effect displayed by the lamp through the customization interface of the client terminal, and the client terminal can determine the customized data in response to the user's setting operation on the customization interface.

The customization interface refers to the interface in which the user can customize the lighting effect displayed by the lamp. The setting operation refers to the operation performed by the user to customize the lighting effect of the lamp through the customization interface. The customized data refers to the data corresponding to the user's customized setting of the lighting effect displayed by the lamp. The detailed description of step 901 can refer to the detailed description of step 501.

902. If the customized data includes a brightness value, the client terminal executes step 903.

After determining the customized data, the client terminal can determine the type of the customized data, that is, determine whether the customized data is data corresponding to the color of the lighting effect, data corresponding to the color temperature of the lighting effect, data corresponding to the brightness of the lighting effect, or other data related to the lighting effect. In the case where the customized data is data corresponding to the brightness of the lighting effect, step 903 can be executed.

903. The client terminal sends the target brightness data to the lamp.

After the user saves the setting operation on the customization interface to obtain target brightness data, the client terminal can send the target brightness data to the lamp.

904. The lamp controls multiple light-emitting units to display the corresponding lighting effect according to the target brightness data.

After receiving the target brightness data, the lamp can control the multiple light-emitting units included in the lamp to display the corresponding brightness according to the target brightness data.

Accordingly, in embodiments described in FIG. 9, the user can customize the lighting effect displayed by the lamp through the client terminal, and the client terminal can determine the customized data in response to the user's setting operation for the customization interface. In the case where the customized data is a brightness value, the client terminal can send the target brightness data to the lamp and, after the lamp receives the target brightness data, the lamp can control multiple light-emitting units to display the corresponding lighting effect according to the target brightness data, thereby realizing the control of the brightness of the lamp.

It should be understood that the same or corresponding information in the above different embodiments can be referenced to each other. The above embodiments can be used as individual embodiments separately or in combination as an embodiment.

Figure 10:
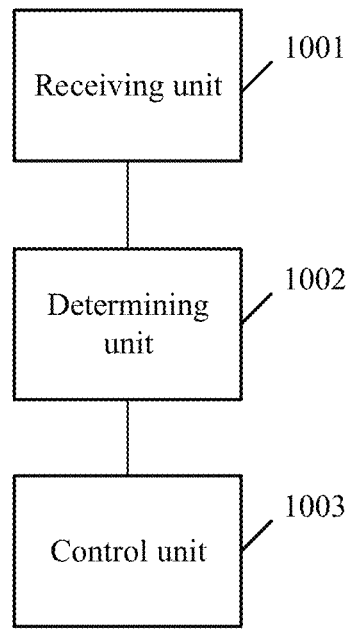
FIG. 10 illustrates a schematic structural diagram of a control device according to an embodiment of the present disclosure.

FIG. 10 illustrates a structural schematic diagram of a control device according to an embodiment of the present disclosure. The control device may be applied to a lamp, and the lamp may include a plurality of light-emitting units. As shown in FIG. 10, the control device may include: a receiving unit 1001, a determining unit 1002, and a control unit, etc.

The receiving unit 1001 is for receiving target RGB data from a client terminal. The determining unit 1002 is for, if there is target RGB data in the correspondence relationship between the RGB data and color temperature values, determining a target color temperature value corresponding to the target RGB data based on the correspondence relationship.

The control unit 1003 is for controlling a plurality of light-emitting units to display the corresponding lighting effect according to the target color temperature value. In some embodiments, the control unit 1003 is also used for: if there is no target RGB data in the correspondence relationship, controlling the plurality of light-emitting units to display corresponding lighting effects according to the target RGB data.

In some embodiments, the control unit 1003 is specifically used for: calculating the output grayscale of cold white color and the output grayscale of warm white color according to the target color temperature value; and controlling a plurality of light-emitting units to display the corresponding lighting effect according to the output grayscale of cold white color and the output grayscale of warm white color.

Accordingly, in embodiments described in FIG. 10, the lamp can receive the first RGB data from the client terminal. When the first RGB data exists in the first correspondence relationship, the lamp can determine the target color temperature value corresponding to the first RGB data based on the first correspondence relationship, and then control multiple light-emitting units to display the corresponding lighting effect according to the target color temperature value. Even when the Tuya protocol only supports the transmission of RGB data, the user still can set the color temperature displayed by the lamp, thereby improving the lighting effect displayed by the lamp.

Figure 11:
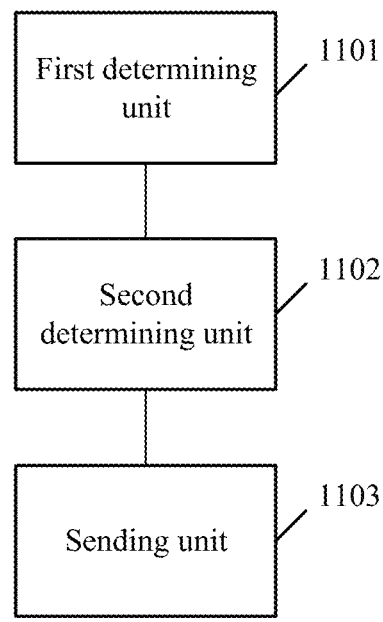
FIG. 11 illustrates a schematic structural diagram of another control device according to an embodiment of the present disclosure.

FIG. 11 illustrates a structural schematic diagram of another control device according to the embodiment of the present disclosure. As shown in FIG. 11, the control device includes: a first determining unit 1101, a second determining unit 1102, and a sending unit 1103, etc.

The first determining unit 1101 may be used to determine the customized data in response to the setting operation for the customization interface. The second determining unit 1102 may be used to, if the customized data is a color temperature value, determine the first RGB data corresponding to the customized data based on the correspondence relationship between the RGB data and color temperature values.

The sending unit 1103 may be used to send the first RGB data to the lamp, so that the lamp determines the target color temperature value corresponding to the first RGB data based on the correspondence relationship, and controls the multiple light-emitting units included in the lamp to display the corresponding lighting effect according to the target color temperature value.

In some embodiments, the second determining unit 1102 is also used for, if the customized data includes color, determine the second RGB data corresponding to the customized data according to the second correspondence relationship between the RGB data and color values. The sending unit 1103 is used for sending the second RGB data to the lamp, so that the lamp controls the plurality of light-emitting units to display the corresponding lighting effect according to the second RGB data.

In some embodiments, the sending unit 1103 may be used for judging whether the second RGB data exists in the first correspondence relationship; and, if the second RGB data does not exist in the first correspondence relationship, sending the second RGB data to the lamp.

In some embodiments, the sending unit 1103 may be used for, if the second RGB data exists in the first correspondence relationship, adjusting the second RGB data so that the adjusted RGB data does not exist in the first correspondence relationship, and obtaining the third RGB data; and sending the third RGB data to the lamp.

Accordingly, in embodiments described in FIG. 11, the user can customize the lighting effect displayed by the lamp through the client terminal, and the client terminal can determine the customized data in response to the user's setting operation on the customization interface. In the case where the customized data is a color temperature value, the client terminal can determine the first RGB data corresponding to the customized data based on the first correspondence relationship between the RGB data and color temperature values. The client terminal can send the first RGB data to the lamp so that the lamp displays the corresponding lighting effect according to the first RGB data. Even if the Tuya protocol only supports the transmission of RGB data, the user can set the color temperature displayed by the lamp to improve the effect of the lighting effect displayed by the lamp.

Those skilled in the art can understand that, for the convenience and simplicity of description, the specific working process of the above-described devices and units can refer to the corresponding process in the aforementioned method embodiments, and will not be repeated here.

In certain embodiments according to the present disclosure, the connection or coupling between the units can be electrical, mechanical or other forms of coupling. Further, the functional modules in the various embodiments of the present disclosure can be integrated in a processing unit, or each unit can exist physically separately, or two or more units can be integrated in one unit. The above-mentioned integrated unit can be implemented in the form of hardware or in the form of software functional modules.

Figure 12:
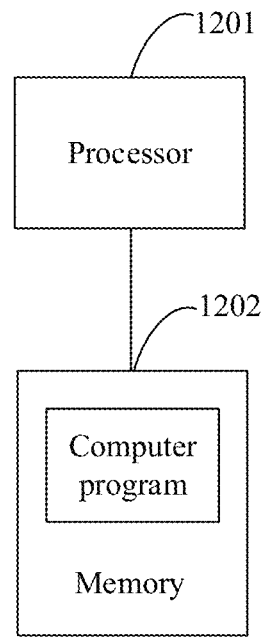
FIG. 12 illustrates a schematic structural diagram of an electronic device according to an embodiment of the present disclosure.

FIG. 12 illustrates a structural schematic diagram of an electronic device according to an embodiment of the present disclosure. As shown in FIG. 12, the electronic device may include a processor 1201 and a memory 1202. The memory 1202 stores computer program in the form of program instructions. When the computer program (program instructions) is executed by the processor 1201, the various processes according to the above embodiments can be implemented. Those skilled in the art can understand that the structure of the electronic device shown in the figure does not constitute a limitation on the electronic device, and can include more or less components than shown in the figure, or can combine certain components or arrange components differently.

Processor 1201 may include one or more processing cores. The processor 1201 uses various interfaces and buses to connect various parts of the entire electronic device, and executes various functions of the electronic device and processes data by running or executing instructions, programs, code sets or instruction sets stored in the memory 1202, and calling data stored in the memory 1202. Optionally, the processor 1201 may be implemented in at least one hardware form of digital signal processing (DSP), field-programmable gate array (FPGA), and programmable logic array (PLA). The processor 1201 may integrate one or a combination of a central processing unit (CPU), a graphics processor (GPU), a modem, etc. Among them, the CPU mainly handles the operating system, user interface, and applications; the GPU is responsible for rendering and drawing the display content; and the modem is used to handle wireless communications. It can be understood that the above-mentioned modem may not be integrated into the processor 1201 and may be implemented solely through a communication chip.

The memory 1202 may include random access memory (RAM) or read-only memory (Read-Only Memory). Memory 1202 may be used to store instructions, programs, codes, sets of codes, or sets of instructions. The memory 1202 may include a program storage area and a data storage area, where the program storage area may store instructions for implementing an operating system, instructions for implementing at least one function, instructions for implementing various method embodiments described and the like. The storage data area can also store data created by the electronic device during use.

Although not shown, the electronic device may also include a display unit, etc., which will not be repeated here. Specifically, in one embodiment, the processor 1201 in the electronic device may load the executable files corresponding to the processes of one or more application programs into the memory 1202 according to user instructions, and the processor 1201 may execute the application programs stored in the memory 1202, thereby implementing the various processes according to the above embodiments.

The electronic device can be a device installed with the above client terminal, or installed with the above lamp. For detailed descriptions, reference can be made to the relevant description in the above embodiments.

Figure 13:
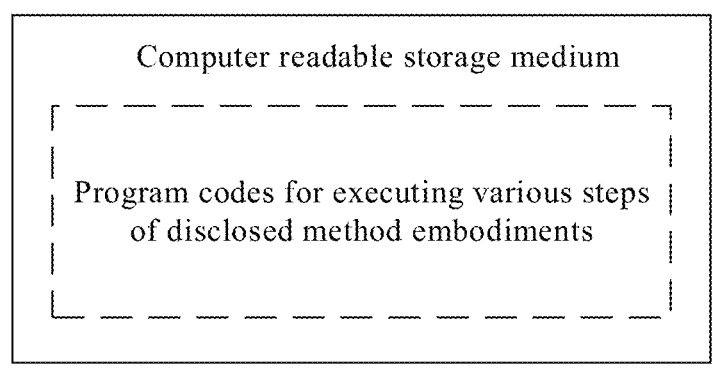
FIG. 13 illustrates a schematic structural diagram of a computer-readable storage medium according to an embodiment of the present disclosure.

As shown in FIG. 13, embodiments of the present disclosure also disclose a computer-readable storage medium, in which computer program instructions are stored, and the computer program instructions can be called by the processor to execute the processes described in the above embodiments.

The computer-readable storage medium can be an electronic memory such as a flash memory, an EEPROM (electrically erasable programmable read-only memory), an EPROM, a hard disk or a ROM. Optionally, the computer-readable storage medium may include a non-volatile computer-readable storage medium (or non-transitory computer-readable storage medium). The computer-readable storage medium has a storage space for program codes for executing any processes in the above embodiments. These program codes can be read from or written into one or more computer program products. The program code may be compressed, for example, in an appropriate form.

According to one aspect of the present disclosure, a computer program product or computer program is disclosed, the computer program product or computer program including computer instructions, the computer instructions being stored in a computer-readable storage medium. The processor of the electronic device reads the computer instructions from the computer-readable storage medium, and the processor executes the computer instructions, so that the electronic device executes the processes according to the various disclosed embodiments.

The above only illustrates the present disclosure, and does not limit the present disclosure in any form. Any person skilled in the art can make changes or modifications to equivalent embodiments of equivalent changes using the above disclosed technical content without departing from the scope of the technical solution of the present disclosure. However, such modification, equivalent change and modification made to the above embodiments based on the technical essence of the present disclosure without departing from the content of the technical solution of the present disclosure still falls within the scope of the technical solution of the present disclosure.

What is claimed is:

1. A control method applicable to a lamp, the lamp including a plurality of light-emitting units, and the method comprising:
    receiving target RGB data from a client terminal;
    when the target RGB data exists in a correspondence relationship between RGB data and color temperature values, determining a target color temperature value corresponding to the target RGB data based on the correspondence relationship, wherein the correspondence relationship between the RGB data and color temperature values is used to convert color temperature data into corresponding RGB data where a communication protocol used for data communication between the client terminal and the lamp does not support color temperature data transmission; and
    controlling the plurality of light-emitting units to display corresponding lighting effect according to the target color temperature value,
    wherein the controlling the plurality of light-emitting units to display the corresponding lighting effect according to the target color temperature value further includes:
    calculating an output grayscale of cold white color and an output grayscale of warm white color according to the target color temperature value; and
    controlling the plurality of light-emitting units to display the corresponding lighting effect according to the output grayscale of cold white color and the output grayscale of warm white color.

2. The method according to claim 1, further comprising:
    when the target RGB data does not exist in the correspondence relationship, controlling the plurality of light-emitting units to display the corresponding lighting effect according to the target RGB data.

3. The method according to claim 1, wherein:
    the light-emitting unit includes multiple lighting-sources;
    the receiving target RGB data from a client terminal further includes:
        receiving the target RGB data and target lighting-source information from the client terminal; and
    the controlling the plurality of light-emitting units to display the corresponding lighting effect according to the target color temperature value comprises:
        determining one or more target lighting-sources according to the target lighting-source information, and
        controlling the one or more target lighting-sources to display the corresponding lighting effect according to the target color temperature value.

4. The method according to claim 1, further comprising:
    receiving target brightness data from the client terminal; and controlling the plurality of light-emitting units to display the corresponding lighting effect according to the target brightness data.

5. A control method, comprising:
determining customized data in response to a setting operation on a customization interface;
when the customized data includes a color temperature value, determining first RGB data corresponding to the customized data based on a first correspondence relationship between RGB data and color temperature values, wherein the first correspondence relationship between the RGB data and color temperature values is used to convert color temperature data into corresponding RGB data where a communication protocol used for data communication between the client terminal and the lamp does not support color temperature data transmission;
sending the first RGB data to a lamp, so that the lamp can determine a target color temperature value corresponding to the first RGB data based on the correspondence relationship between the RGB data and color temperature values, and control a plurality of light-emitting units included in the lamp to display corresponding lighting effect according to the target color temperature value;
when the customized data includes a color value, determining second RGB data corresponding to the customized data according to a second correspondence relationship between RGB data and color values; and
sending the second RGB data to the lamp, so that the lamp can control the plurality of light-emitting units to display corresponding lighting effect according to the second RGB data.

6. The method according to claim 5, wherein the sending the second RGB data to the lamp further comprises:
judging whether the second RGB data exists in the first correspondence relationship; and
when the second RGB data does not exist in the first correspondence relationship, sending the second RGB data to the lamp.

7. The method according to claim 6, wherein the sending the second RGB data to the lamp further comprises:
when the second RGB data exists in the first correspondence relationship, adjusting the second RGB data to obtain third RGB data, such that the adjusted RGB data does not exist in the first correspondence relationship; and
sending the third RGB data to the lamp.

8. The method according to claim 5, wherein the light-emitting unit includes multiple lighting-sources, and the method further comprises:
in response to the selection operation of a target lighting-source among the multiple lighting-sources, determining target lighting-source information;
wherein the sending the first RGB data to a lamp further comprises:
sending the first RGB data and the target lighting-source information to the lamp;
wherein the lamp controlling a plurality of light-emitting units included in the lamp to display corresponding lighting effect according to the target color temperature value further comprises:
the lamp determines the target lighting-source according to the target lighting-source information, and controls the target lighting-source to display corresponding lighting effect according to the target color temperature value.

9. The method according to claim 5, further comprising:
when the customized data includes a brightness value, sending target brightness data to the lamp, so that the lamp can control the multiple light-emitting units to display corresponding lighting effect according to the target brightness data.

10. A non-transitory computer-readable storage medium, wherein the computer-readable storage medium stores a computer program which, when executed by a processor, is configured for implementing a control method, the method comprising:
determining customized data in response to a setting operation on a customization interface;
when the customized data includes a color temperature value, determining first RGB data corresponding to the customized data based on a first correspondence relationship between RGB data and color temperature values, wherein the first correspondence relationship between the RGB data and color temperature values is used to convert color temperature data into corresponding RGB data when a communication protocol used for data communication between the client terminal and the lamp does not support color temperature data transmission;
sending the first RGB data to a lamp, so that the lamp can determine a target color temperature value corresponding to the first RGB data based on the correspondence relationship between the RGB data and color temperature values, and control a plurality of light-emitting units included in the lamp to display corresponding lighting effect according to the target color temperature value;
when the customized data includes a color value, determining second RGB data corresponding to the customized data according to a second correspondence relationship between RGB data and color values; and
sending the second RGB data to the lamp, so that the lamp can control the plurality of light-emitting units to display corresponding lighting effect according to the second RGB data.

11. The non-transitory computer-readable storage medium according to claim 10, wherein the sending the second RGB data to the lamp further comprises:
judging whether the second RGB data exists in the first correspondence relationship; and
when the second RGB data does not exist in the first correspondence relationship, sending the second RGB data to the lamp.

12. The non-transitory computer-readable storage medium according to claim 11, wherein the sending the second RGB data to the lamp further comprises:
when the second RGB data exists in the first correspondence relationship, adjusting the second RGB data to obtain third RGB data, such that adjusted RGB data does not exist in the first correspondence relationship; and
sending the third RGB data to the lamp.

13. The non-transitory computer-readable storage medium according to claim 10, wherein the light-emitting unit includes multiple lighting-sources, and the control method further comprises:
in response to the selection operation of a target lighting-source among the multiple lighting-sources, determining target lighting-source information;
wherein the sending the first RGB data to a lamp further comprises:

sending the first RGB data and the target lighting-source information to the lamp;
wherein the lamp controlling a plurality of light-emitting units included in the lamp to display corresponding lighting effect according to the target color temperature value further comprises:
the lamp determines the target lighting-source according to the target lighting-source information, and controls the target lighting-source to display corresponding lighting effect according to the target color temperature value.

14. The non-transitory computer-readable storage medium according to claim 10, the control method further comprising:
when the customized data includes a brightness value, sending target brightness data to the lamp, so that the lamp can control the multiple light-emitting units to display corresponding lighting effect according to the target brightness data.

\* \* \* \* \*